United States Patent [19]

Lotz et al.

[11] Patent Number: 4,928,932

[45] Date of Patent: May 29, 1990

[54] BAND CASTING-SETTING-BURN-CUTTING MACHINE IN A LINE-LIKE LAYOUT

[75] Inventors: Horst K. Lotz, Königstein-Johanniswald; Günther Thomma, Wiesbaden-Delkenheim, both of Fed. Rep. of Germany

[73] Assignee: Aute Gesellschaft fuer autogene Technik mbH, Switzerland

[21] Appl. No.: 214,215

[22] Filed: Jul. 1, 1988

[30] Foreign Application Priority Data

Jan. 7, 1987 [DE] Fed. Rep. of Germany ....... 3721685

[51] Int. Cl.$^5$ .............................................. B23K 7/02
[52] U.S. Cl. ........................................ 266/58; 266/48
[58] Field of Search ....................... 266/48, 58, 60, 68, 266/77

[56] References Cited

U.S. PATENT DOCUMENTS

| 3,141,367 | 7/1964 | Keener et al. | 266/48 |
| 3,357,690 | 12/1967 | Firestone | 266/48 |
| 4,172,586 | 10/1979 | Schmitt | 266/48 |

Primary Examiner—S. Kastler
Attorney, Agent, or Firm—Gifford, Groh, Sprinkle, Patmore and Anderson

[57] ABSTRACT

With a band casting-setting-burn-cutting machine in a line-like layout, to thermochemically separate from raw material of great width and thickness to roll out sheets of steel, in particular with high finishing speeds, is presented an attachment system; that without touching or with just the smallest stress through a measuring roller (2) or through an in- or on-attaching system regulates the simultaneous speeds between the band-like material (1) and the band casting-setting-burn-cutting machine (3) for the burn-cutting to be effected.

20 Claims, 1 Drawing Sheet

BAND CASTING-SETTING-BURN-CUTTING MACHINE IN A LINE-LIKE LAYOUT

BACKGROUND OF THE INVENTION

I. Field of the Invention

The invention relates to a band casting-setting-burn-cutting machine in a roller conveyor system which thermochemically separates raw material of great width and thickness in order to flatten the raw material into sheets of steel with great speed.

II. Description of the Prior Art

The evolution of end products of steel has led to the ability to produce continuously poured slabs with thicknesses from 100 to 300 mm. and widths of approximately 600 to 2,400 mm. However, continuous bands of 30 to 60 mm. thick and 1,000 to 2,000 mm. wide can be poured at pouring speeds of 6 m/min.

Mechanical scissors cannot be employed at such speeds. Also, the thin band thickness does not permit use of the power of the line of a burn-cutting machine, and during the separations, the heat losses which arise are a disadvantage in terms of further commercial processing.

The invention therefore is advantageous in that despite a thin band thickness and the given high speeds, the machine can effect a separation of the thin ribbon-like material, while greatly diminishing heat loss to aid in further commercial processing.

SUMMARY OF THE INVENTION

The invention is based on an attachment arrangement being provided to work in conjunction with the roller conveyor system whereby a measuring rod or roller or an in- or on-attaching system measures the flow rate of the band of material to determine the rate of travel for the band-cutting machine to simultaneously prepare for the burn-area.

An advantage to this presentation is based on the existence of an impulse generator on the top or underside of the traveling measuring wheel driving it. The impulse generator, having a fine resolution, (as an example one impulse=0.1 mm.), supplies impulses per unit of time to the speed control, and therefore the guiding and regulation control, of the burn-cutting machine drive mechanism in a compatible current and driving frequency such that synchronization is effected.

Another advantage of the invention is presented here, and that is that on the roller conveyor system of the burn-cutting machine is fitted a burner arm, on which at least two burners are provided. These burners are located an appropriate distance from one another, one behind the other, such that the first is provided to cut into and cut the edges of the material, while the second burner is for automatic hole piercing, cutting into, or cutting.

In further characterizing the advantages of the invention, in order to quickly pre-heat the material to ignition temperature with a strong heating flame, one or more cutting burners are fitted with powdered iron nozzles. The mechanism for this short preheating process is provided by fitting a connection to the cutting oxygen. This connection is fitted to provide for the movement to the hole piercing or cutting mode.

The burner arm or beam is water-cooled and all supply lines for all burners or powdered iron nozzles are internal such that all nozzle receptors, and as such, all burner receptors carry with them interchangeable burner cut-offs.

A further characterization of the invention is that the burner arm, in the range of the band casting, is fitted with interchangeable burner elements. These burner elements are comprised of different lengths to provide the desired burner distances which correlate to the width of the band of material. The elements provide for through flowing medias via an O-ring or something similar and are fitted with flanges that screw on throughout and on the burner arm stub.

In order to minimize heat loss, the invention further provides that in the area of the burn-cutting, a hood cover is supplied in this area, and the burner arm enters through a slit in this hood.

In order to effect the dual cutting of shorter pieces, it is proposed that the burn-cutting machine be fitted with two burner arms a preferred distance from each other in order to dually cut shorter pieces, and having a common cutting assistance drive.

Cutting pieces generated in this area are provided for by a cutting piece retaining device.

Collared arm support rollers are provided in the cutting as well as as warming area, for the support of the turning aside of the band of material outside the hood along with the cutting piece retaining device.

In order to minimize heat loss as much as possible, an inletting and compressing runner or roller is provided in front of the band inlet slit of the warming hood, whereby the compressing roller and the measuring roller or rod are one and the same piece.

The burner can also be fitted with a dividing piece in which is screwed a cutting nozzle of extremely short length.

The burners are composed of a burner arm and associated nozzle fittings and lines, whereby the nozzle lines can be provided with extension pieces.

BRIEF DESCRIPTION OF THE DRAWINGS

The invention will be further explained by example and with the aid of the accompanying drawings.

The drawings show.

DETAILED DESCRIPTION OF THE PREFERRED EMBODIMENT

Figure 1:
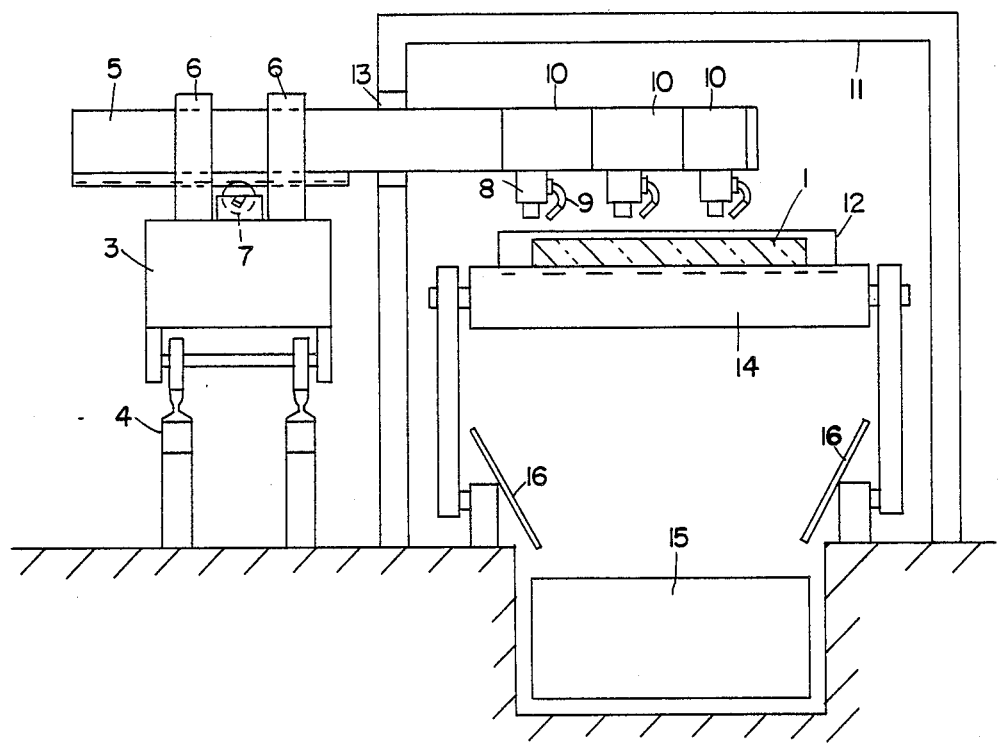
FIG. 1: the side view of a band casting-setting-burn-cutting machine.
Figure 2:
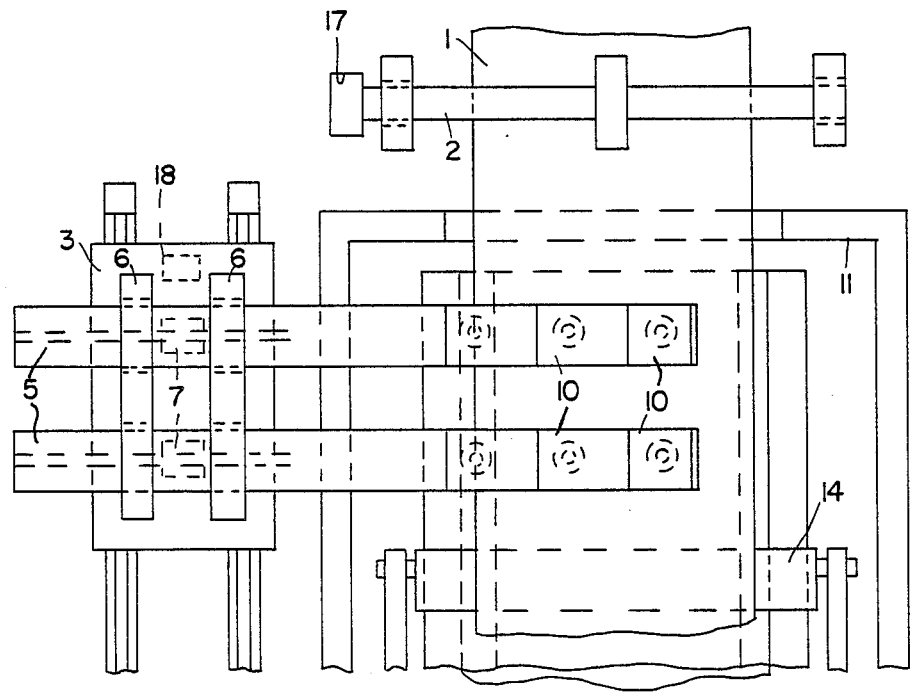
FIG. 2: the top view of a band casting-setting-burn-cutting machine according to FIG. 1.

In FIG. 1 is an illustration of a band casting-setting-burn-cutting machine, in which a cut is effected in the band of material 1. In front of the inlet of the band of material 1 is a measuring roller 2 according to FIG. 2, that serves to move the band casting-setting-burn-cutting machine 3 simultaneously with the band of material 1 on the burn-cutting machine conveyor line 4. The band casting-setting-burn-cutting machine 3 carries a pair of burner arms or offshoots 5. With the help of sliding bearings 6, the burner arms 5 can be moved in the direction of the band of material via the drive gear 7, and therefore the burner arms 5 having burners 8 attached are arranged perpendicular to the material to be cut. Each burner 8 has a corresponding nozzle 9 and associated burner element 10. The burn-cutting area is defined by a warming hood 11, that is equipped with a band-like slit 12. For this purpose, the measuring roller 2 simultaneously functions as a band compressor, so that an upwards-arching of the band of material 1 is prevented, and therefore the band-inlet slit 12 can be kept very small. Each burner arm passes from the exterior arrangements of the band casting-setting-burn-cutting machine 3, into the interior of the warming hood 11 through a burner arm slit 13 and over the band of material which is to be separated which is moving over the band support rollers 14.

In order to provide for waste in the area of the burn-cutting, a cutting piece receptacle 15 is provided, whereby the laterally arranged refuse-sheets 16 are secured, so that the cutting pieces are guided to the cutting piece receptacle 15.

In other applications there are other possibilities, where the burner-elements 10 can also function with plasma or laser burners, which are not pictured here.

With the measuring roller 2 pressed against the band it is possible, with an impulse generator comprised of a high number of impulses, 4,000 for example, to measure the rate of speed the material is moving in order to match the speed of the burner arm 5 with the material. The impulse generator 17 produces an exact electrical analog of the driving of the revolutions in a compatible electrical current and driving frequency for the motor 18 of the band casting-setting-burn-cutting machine. The rate of travel of the burn cutting machine is thereby synchronized with the speed of the band. This permits the differences between the over-driving speed of the band casting-setting-burn-cutting machine 3 and the pouring speed of the band of material 1 to remain at 1 mm./min.; which normally is within tolerances for the cutting gap.

The band casting-setting-burn-cutting machine also fulfills the requirements for faster cutting speed.

With the measurements of the generator and measuring roller, the burner arm 5 is moved such that the machine-closest burner 8 cuts into the band of material 1 on the fly. The burner arm 5 then moves ahead over the band thereby travelling parallel with the material. The highest heat conducting burners follow in line behind the first cutout point of the hole-piercing point, formed from pre-heated ignition temperatures, and begin the cutting of the material from the hole-piercing point created by the first burner 8 across the width of the material a predetermined distance via a supply of cutting oxygen. Therefore, each burner 8 cuts a specific length, and each cut merges into the cut of the preceding burners 8 thereby creating a complete cut across the width of the material. Thereby a cut running across the band of material is effected using a multiplicity of burners 8 instead of relying on a single burner.

Since hole-piercing requires a pre-heating by the burner flame and takes a considerable amount of time, powder nozzles 9 are provided to provide support for the hole-piercing. The powder nozzles 9 overcome the uneven heat flames of the burners 8 and ensure the certainty of simultaneous hole-piercing and the commencement of cutting the material.

When using cold material of 30 mm. thickness, with a typical heavy-cutting nozzle suitable for slabs up to 400 mm.; the following data was generated with satisfactory hole-piercing and cutting into results:

| Nozzle distance from workpiece: | | 100 mm. |
|---|---|---|
| Pressure at the burner inlet: | cutting oxygen | 9 bar |
| For the heating flame | { heating oxygen | 2.6 bar |
| | natural gas | 1.7 bar |
| | additional air | 2.0 bar |

The additional air is for a functional powder nozzle (inner diameter 6 mm.) with a powder usage of approximately 12 grams per hole-piercing attempt.

After the heating flame is arranged, while heating, over the cutting-into point, the iron powder supplement is turned on. Over a time span of 2 to 3 sec., the in-flow of cutting oxygen, through the opening of the regulator, is simultaneously elevated from 0 to 9 bar. At the same time the burners 8, capable of approximately 30 to 50 mm./min. hole-piercing and cutting-into capacities, are moved forward. After this, the powder stream is turned off and the cutting speed is raised from approximately 30 to 50 mm./min. within 2 to 4 seconds, rising to approximately 600 mm. Thereby a round hole is created, approximately 20 mm. in diameter, which joins a cutting gap and forms a normal cutting gap of approximately 7 to 8 mm.

For the purpose of hole-piercing, the cutting nozzles 8 can, in specified numbers, continue to burn as auxiliary flames. The extreme shortness of these nozzles allows for the insertion of a dividing piece referred to as a divider-nozzle into the burner. This divider-nozzle can then be screwed into the cutting nozzle. Only in the event of multiple nozzle changes or where the divider-nozzle is threadbare, must they be changed while the burners on the nozzle inlet are still intact. The promotion of the burner elements 10 as parts of the burner arms 5 allows the realization that there are many advantages. The burner elements 10 can optionally be screwed open on the burner arms 5, with a cap on the end of the last burner element 10. Every burner is equipped from flange to flange with supply lines for every functional fuel, in addition to cold water lines. When screwing together two burner elements 10 on a burner arm 5, a gasket made from soft material, such as copper, or O-rings, is seated between them. The burner elements 10 are also practical only with burners 8, specifically with nozzle heads that can be fitted with extension pieces of the burner arms 5. Their width can be adjusted to the width of the band of material 1, so that with 4 burner elements 10 and their burners 8; the first burner cuts into the piece from the outside, while the three other burners pierce holes at $\frac{1}{4}$, $\frac{1}{2}$, $\frac{3}{4}$ of the width of the band of material, so that every burner 8 cuts $\frac{1}{4}$ the width of the band of material 1. With other band widths, other burners, as well as nozzle distances must be chosen.

In this fashion, a heat-tight, water-cooled band casting-setting-burn-cutting machine is made possible, by way of gas-tight lines for heating gas, heating oxygen, cutting oxygen, air and iron powder in addition to cooling water. The ability to accomodate any poured band width is made possible by using varied distances of the nozzles from each other. Exchange of nozzles is easy with minimum wear, and whereby during the cutting pauses, the nozzles in conjunction with the auxiliary flames continue to burn. With the inventive band casting-setting-burn-cutting machine one can attain high pouring speeds, with specific band-thicknesses and larger band width. The minimalization of heat loss in the cutting area makes it possible to continue commercial processing. The presented band casting-setting-burn-cutting machine makes it possible to elicit separations of thin bands of material at the highest pouring speeds.

I claim:

1. A burn cutting apparatus for separating a piece from a sheet metal band having a pair of lateral edges, said burn cutting apparatus comprising:

a conveyor line for transporting said metal band;

a burn cutting machine moveably mounted to a pair of rails, said machine moveable by a motor along said pair of rails in a direction parallel to said conveyor line, said burner cutting machine having at least one burner arm moveable in a direction normal to the direction of movement of said metal band on said conveyor line, each said burner arm having a least one burner for cutting said metal band to separate said piece therefrom; and means for moving said burn cutting machine along said rails at a speed equal to the speed of said band moving along said conveyor, said means for moving comprising a first roller having an impulse generator, said roller mounted transversely across said conveyor line upstream of said burn cutting machine, said roller contacting said band, said impulse generator producing a predetermined number of impulses in response to a speed of movement of said roller, means for controlling the speed of said motor of said burn cutting machine in response to said predetermined number of impulses, said means for controlling measuring said number of impulses per unit of time to produce an electrical analog to control said motor to produce a rate of travel of said burn cutting machine equal to the speed of travel of said band.

2. The burn cutting apparatus of claim 1, further comprising a hood, said hood positioned over said conveyor line to return heat, said hood having an elongated slit positioned to accept said at least one burner arm therethrough.

3. The burn cutting apparatus of claim 1, wherein said at least one burner arm comprises a pair of burner arms spaced apart a predetermined distance, said pair of burner arms being mounted to said burn cutting machine such that said predetermined distance may be adjusted to correspond to the length of said piece to be cut from said band.

4. The burn cutting apparatus of claim 1 further comprising a container for accepting pieces cut from said band, said container mounted at one end of said conveyor line.

5. The burn cutting apparatus of claim 1, wherein said conveyor line further comprises a plurality collared arm support rollers.

6. The burn cutting apparatus of claim 1, wherein said hood further comprises a second slit to permit said band to enter said hood, wherein said conveyor line further comprises a compressing roller mounted upstream of said hood whereby said band is positioned for entry through said second slit.

7. The burn cutting apparatus of claim 1, wherein said first roller is also said compressing roller.

8. A burn cutting apparatus for separating a piece from a sheet metal band having a pair of lateral edges, said burn cutting apparatus comprising:

a conveyor line for transporting said metal band;

a burn cutting machine moveably mounted to a pair of rails, said machine moveable by a motor along said pair of rails in a direction parallel to said conveyor line, said burner cutting machine having at least one burner arm moveable in a direction normal to the direction of movement of said metal band on said conveyor line, each said burner arm having a least one burner for cutting said metal band to separate said piece therefrom; and means for moving said burn cutting machine along said rails at a speed equal to the speed of said band moving along said conveyor, said means for moving comprising a first roller having an impulse generator, said roller mounted transversely across said conveyor line upstream of said burn cutting machine, said roller contacting said band, said impulse generator producing a predetermined number of impulses in response to a speed of movement of said roller, means for controlling the speed of said motor of said burn cutting machine in response to said predetermined number of impulses, said means for controlling measuring said number of impulses per unit of time to produce an electrical analog to control said motor to produce a rate of travel of said burn cutting machine equal to the speed of travel of said band; and a first burner and at least one second burner spaced apart from said first burner on said burner arm, said first burner arm positioned to cut a first slit from one of said lateral edges transversely across said band, said at least one second burner cutting a hole in said band between said lateral edges of said band and further cutting a second slit transversely across said band whereby a piece is separated from said band when said first slit merges with said second slit.

9. The burn cutting apparatus of claim 8, wherein each of said first and second cutting burners is fitted with a powdered iron nozzle and means for supply cutting oxygen to said nozzle, said nozzle selectively operative for preheating said band ignition temperature prior to cutting by said cutting burners.

10. The burn cutting apparatus of claim 8, wherein said at least one cutting arm has a plurality of burner receptors and means for water cooling a plurality of supply lines, said plurality of supply lines being mounted internally within said burner arm and communicating with said burner receptors, each said burner receptor having a burner cutoff.

11. The burn cutting apparatus of claim 10, wherein each said burner is provided with a pair of flanges for interchangeably mounting on said burner arm and means for connecting said burner to said plurality of supply lines, each said burner having a predetermined length such that the number of burners utilized is proportioned to the width of the band.

12. The burn cutting apparatus of claim 8, further comprising a hood, said hood positioned over said conveyor line to return heat, said hood having an elongated slit positioned to accept said at least one burner arm therethrough.

13. The burn cutting apparatus of claim 8, wherein said at least one burner arm comprises a pair of burner arms spaced apart a predetermined distance, said pair of burner arms being mounted to said burn cutting machine such that said predetermined distance may be adjusted to correspond to the length of said piece to be cut from said band.

14. The burn cutting apparatus of claim 8 further comprising a container for accepting pieces cut from said band, said container mounted at one end of said conveyor line.

15. The burn cutting apparatus of claim 8, wherein said conveyor line further comprises a plurality collared arm support rollers.

16. The burn cutting apparatus of claim 8, wherein said hood further comprises a second slit to permit said band to enter said hood, wherein said conveyor line further comprises a compressing roller mounted upstream of said hood whereby said band is positioned for entry through said second slit.

17. The burn cutting apparatus of claim 8, wherein said first roller is also said compressing roller.

18. The burn cutting apparatus of claim 8, wherein a division piece is threadably mounted into a burner for hole piercing.

19. The burn cutting apparatus of claim 8, wherein said burner comprises a plurality of nozzle fittings and lines for connection to said supply lines of said burner arm.

20. The burner cutting apparatus of claim 19, wherein each of said nozzle lines is provided with an extension piece.

* * * * *